(12) United States Patent
Qian et al.

(10) Patent No.: US 10,650,809 B2
(45) Date of Patent: May 12, 2020

(54) SPEECH RECOGNITION METHOD AND DEVICE

(71) Applicant: BAIDU ONLINE NETWORK TECHNOLOGY (BEIJING) CO., LTD., Beijing (CN)

(72) Inventors: Sheng Qian, Beijing (CN); Fuping Pan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 134 days.

(21) Appl. No.: 15/758,159

(22) PCT Filed: Jul. 26, 2016

(86) PCT No.: PCT/CN2016/091765
§ 371 (c)(1),
(2) Date: Mar. 7, 2018

(87) PCT Pub. No.: WO2017/101450
PCT Pub. Date: Jun. 22, 2017

(65) Prior Publication Data
US 2018/0254039 A1    Sep. 6, 2018

(30) Foreign Application Priority Data
Dec. 14, 2015 (CN) .......................... 2015 1 0925644

(51) Int. Cl.
*G10L 15/183* (2013.01)
*G10L 15/02* (2006.01)
(Continued)

(52) U.S. Cl.
CPC ............ *G10L 15/183* (2013.01); *G10L 15/02* (2013.01); *G10L 15/08* (2013.01); *G10L 15/14* (2013.01);
(Continued)

(58) Field of Classification Search
CPC ...... G10L 15/183; G10L 15/02; G10L 19/008; G10L 2015/0631; G10L 15/14; G10L 15/08
See application file for complete search history.

(56) References Cited

FOREIGN PATENT DOCUMENTS

| CN | 1335978 | 2/2002 |
|---|---|---|
| CN | 103151039 | 6/2013 |

(Continued)

OTHER PUBLICATIONS

Miao et al., EESEN:End-to End Speech Recognition Using Deep RNN Models and WFST-Based Decoding, Oct. 18, 2015, arXiv (Year: 2015).*

(Continued)

*Primary Examiner* — Sonia L Gay
(74) *Attorney, Agent, or Firm* — Hodgson Russ LLP

(57) ABSTRACT

The present disclosure provides a speech recognition method and device. The method includes: receiving a speech signal; decoding the speech signal according to an acoustic model, a language model and a decoding network established in advance, and dynamically adding a blank unit in a decoding process to obtain an optimum decoding path with the added blank unit, in which the acoustic model is obtained based on connectionist temporal classification training, the acoustic model includes basic pronunciation units and the blank unit, and the decoding network includes a plurality of decoding paths consisting of the basic pronunciation units; and outputting the optimum decoding path as a recognition result of the speech signal.

15 Claims, 6 Drawing Sheets

(51) Int. Cl.
    *G10L 15/08*     (2006.01)
    *G10L 15/14*     (2006.01)
    *G10L 19/008*     (2013.01)
    *G10L 15/06*     (2013.01)

(52) U.S. Cl.
    CPC .... G10L 19/008 (2013.01); *G10L 2015/0631* (2013.01)

(56) References Cited

FOREIGN PATENT DOCUMENTS

| | | | |
|---|---|---|---|
| CN | 103794211 A | * | 5/2014 |
| CN | 105139864 | | 12/2015 |
| CN | 105529027 | | 4/2016 |

OTHER PUBLICATIONS

WIPO, ISR for PCT/CN2016/091765, Nov. 1, 2016.

* cited by examiner

SPEECH RECOGNITION METHOD AND DEVICE

CROSS-REFERENCE TO RELATED APPLICATION

This application is a U.S. national phase application of International Application No. PCT/CN2016/091765, filed Jul. 26, 2016, which claims priority to and benefits of Chinese Patent Application No. 201510925644.6, filed with the State Intellectual Property Office of P. R. China on Dec. 14, 2015, the entire contents of which are incorporated herein by reference.

FIELD

The present disclosure generally relates to the field of speech recognition technology, and more particularly, to a speech recognition method and a speech recognition device.

BACKGROUND

Speech recognition is realized mainly by a speech recognition model based on state modeling in the related art. For example, the speech recognition is based on a Hidden Markov Model (HMM for short). The HMM may be regarded as double random processes mathematically. One is an implicit random process which simulates changes of statistical properties of a speech signal by a Markov chain with a finite number of states. The other is a random process of an observed sequence related to each of the states of the Markov chain. In this modeling, one phoneme or one syllable is considered to be divided into a number of non-physical states, and then an output distribution of each of the non-physical states is described according to discrete or continuous Gaussian model or depth learning model. However, based on this modeling, confusion may occur and recognition performance is poor when the speech recognition is performed between two pronunciation units in the process of speech recognition.

SUMMARY

The present disclosure aims to solve at least one of the problems existing in the related art to at least some extent.

Accordingly, a first objective of the present disclosure is to provide a speech recognition method, which may improve accuracy of speech recognition and increase a decoding speed during a recognition process.

A second objective of the present disclosure is to provide a speech recognition device.

In order to achieve above objectives, embodiments of a first aspect of the present disclosure provide a speech recognition method. The method includes: receiving a speech signal; decoding the speech signal according to an acoustic model, a language model and a decoding network established in advance, and adding a blank unit dynamically during a decoding process to obtain an optimum decoding path with the added blank unit, in which the acoustic model is obtained by training based on connectionist temporal classification, the acoustic model includes basic pronunciation units and the blank unit, and the decoding network includes a plurality of decoding paths consisting of the basic pronunciation units; and outputting the optimum decoding path as a recognition result of the speech signal.

With the speech recognition method according to embodiments of the present disclosure, the speech signal is decoded according to the decoding network and the acoustic model established based on connectionist temporal classification, and the blank unit is added dynamically during the decoding process, such that the optimum decoding path with the added blank unit is obtained and regarded as the recognition result of the speech signal, which may solve the problem that confusion may occur between two pronunciation units, thereby improving the accuracy of speech recognition, and also effectively reducing the possible decoding paths, and improving the decoding speed during the recognition process.

Embodiments of a second aspect of the present disclosure provide a speech recognition device. The device includes: a receiving module, configured to receive a speech signal; a decoding module, configured to decode the speech signal according to an acoustic model, a language model and a decoding network established in advance, and add a blank unit dynamically during a decoding process to obtain an optimum decoding path with the added blank unit, in which the acoustic model is obtained by training based on connectionist temporal classification, the acoustic model includes basic pronunciation units and the blank unit, and the decoding network includes a plurality of decoding paths consisting of the basic pronunciation units; and an outputting module, configured to output the optimum decoding path as a recognition result of the speech signal.

With the speech recognition device according to embodiments of the present disclosure, the speech signal is decoded according to the decoding network and the acoustic model established based on connectionist temporal classification, and the blank unit is added dynamically during the decoding process, such that the optimum decoding path with the added blank unit is obtained and regarded as the recognition result of the speech signal, which may solve the problem that confusion may occur between two pronunciation units, thereby improving the accuracy of speech recognition, and also effectively reducing the possible decoding paths, and improving the decoding speed during the recognition process.

Embodiments of a third aspect of the present disclosure provide an electronic device. The device electronic includes: one or more processors; a memory; one or more programs stored in the memory, in which when the one or more programs are executed by the one or more processors, the speech recognition method according to the embodiments of the first aspect of the present disclosure.

Embodiments of a fourth aspect of the present disclosure provide a non-transitory computer-readable storage medium having stored therein one or more programs that, when executed by a device, causes the device to perform the speech recognition method according to the embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
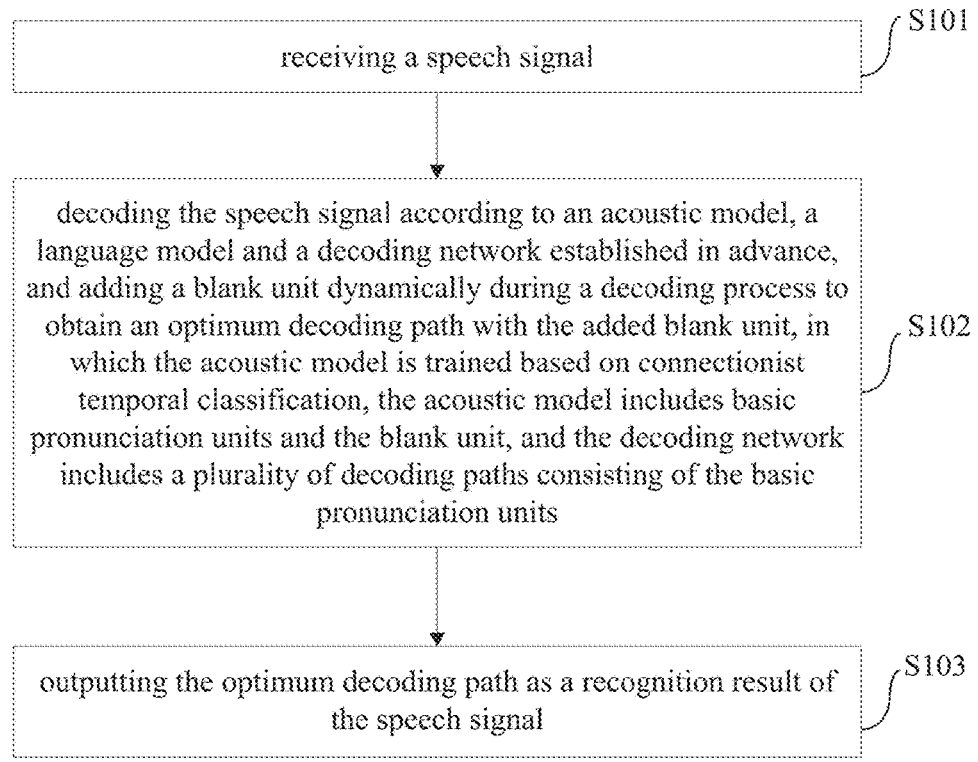
FIG. 1 is a flow chart illustrating a speech recognition method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the description of the present disclosure, it should be understood that, the term "a plurality of" means two or more; terms such as "first" and "second" are used herein for purposes of description and are not intended to indicate or imply relative importance or significance.

A speech recognition method and a speech recognition device according to embodiments of the present disclosure will be described below with reference to the accompanying drawings.

The speech recognition method includes: receiving a speech signal; decoding the speech signal according to an acoustic model, a language model and a decoding network established in advance, and adding a blank unit dynamically during a decoding process to obtain an optimum decoding path with the added blank unit, in which the acoustic model is obtained by training based on connectionist temporal classification, the acoustic model includes basic pronunciation units and the blank unit, and the decoding network includes a plurality of decoding paths consisting of the basic pronunciation units; and outputting the optimum decoding path as a recognition result of the speech signal.

FIG. 1 is a flow chart illustrating a speech recognition method according to an embodiment of the present disclosure.

As illustrated in FIG. 1, this speech recognition method may include followings.

At block S101, a speech signal is received.

At block S102, the speech signal is decoded according to an acoustic model, a language model and a decoding network established in advance, and a blank unit is added dynamically during a decoding process to obtain an optimum decoding path with the added blank unit. The acoustic model is obtained by training based on connectionist temporal classification. The acoustic model includes basic pronunciation units and the blank unit. The decoding network includes a plurality of decoding paths consisting of the basic pronunciation units.

In an embodiment of the present disclosure, the pre-established acoustic model is based on CTC (Connectionist temporal classification) training. In detail, feature extraction may be performed on a large number of speech signals to obtain respective feature vectors of the speech signals. In each feature vector, a blank label is added every predetermined number of pronunciation units. The speech signals added with the blank labels are trained based on CTC to establish the acoustic model. The acoustic model includes a plurality of basic pronunciation units and the blank unit.

The language model may be any language model in the related art or in the future, which is not limited in the present disclosure.

The plurality of basic pronunciation units and jump relationships (i.e. jumping paths) between them in the acoustic model may form a large number of decoding paths. These decoding paths form the decoding network.

The basic pronunciation unit may be, for example an initial consonant of a Chinese syllable or a simple or compound vowel of a Chinese syllable, called as a phoneme.

Figure 2:
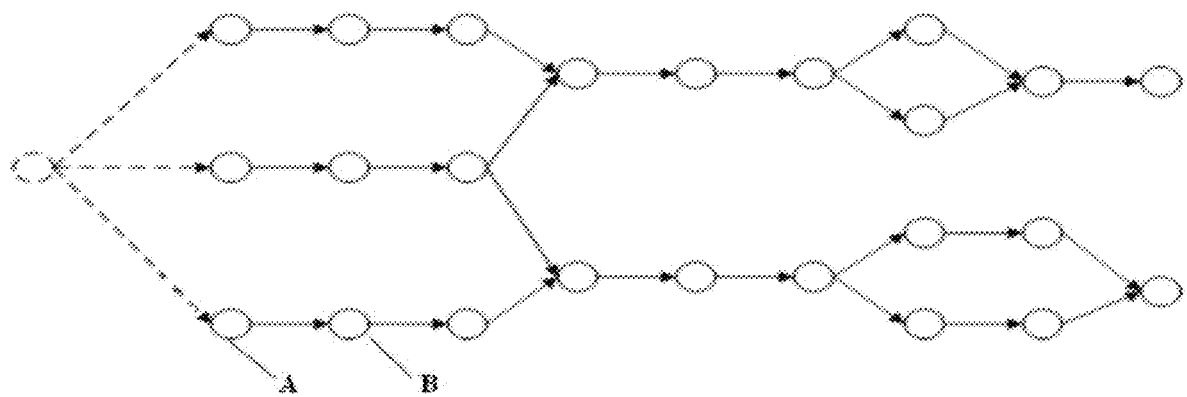
FIG. 2 is a schematic diagram illustrating a decoding network according to an embodiment of the present disclosure.

For example, FIG. 2 is a schematic diagram illustrating a decoding network according to an embodiment of the present disclosure. As illustrated in FIG. 2, the dotted circle represents the beginning of the decoding path. The solid circles (such as A and B) represent the basic pronunciation units in the decoding network. The arrow represents a jumping path between the basic pronunciation units. As can be seen from FIG. 2, there are a plurality of decoding paths in the decoding network. Each decoding path is a possible decoding result for decoding the speech signal.

In embodiments of the present disclosure, the process of decoding the speech signal is a process of selecting an optimum decoding path from the plurality of decoding paths in the decoding network according to the feature vector frame of the speech signal.

Figure 3:
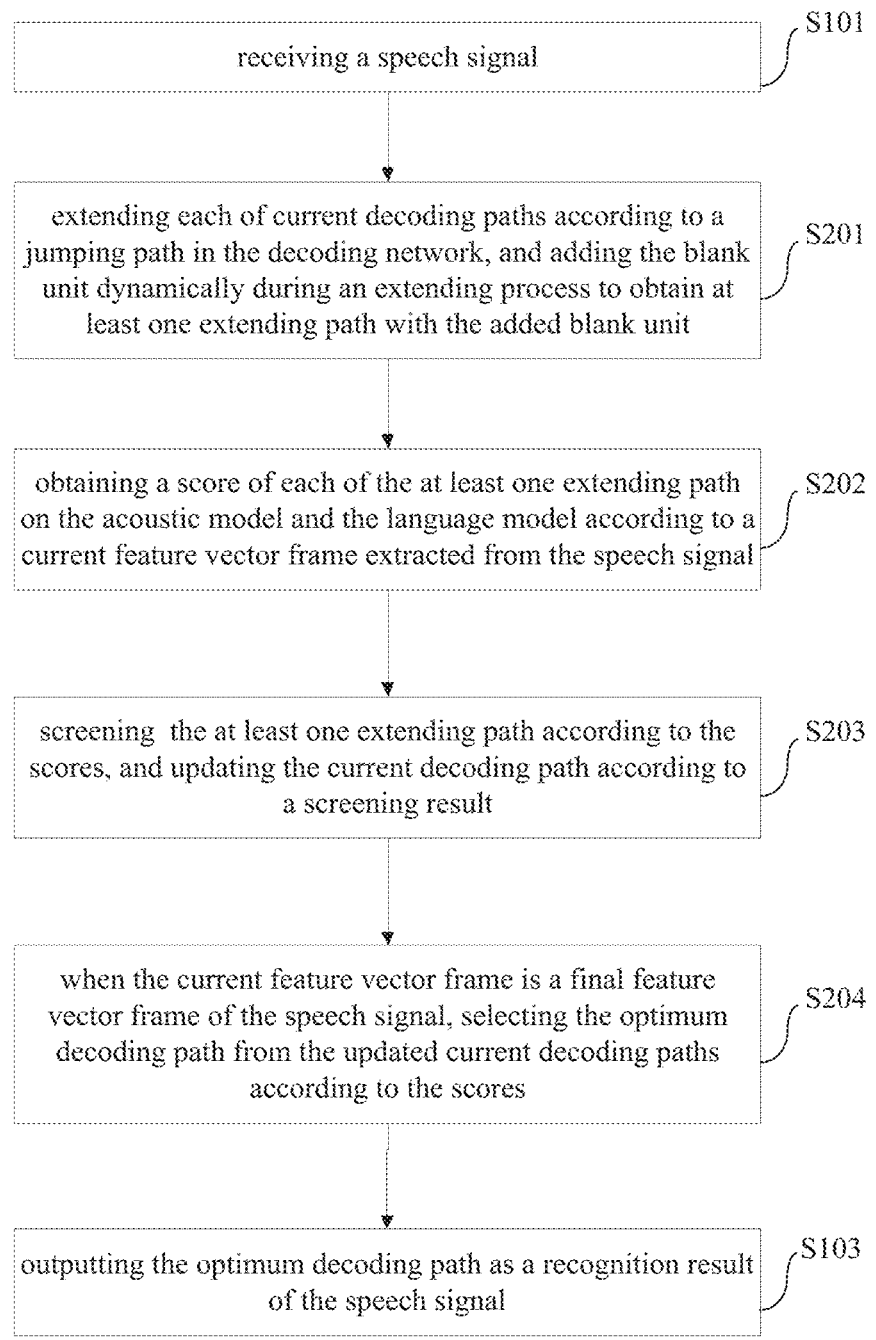
FIG. 3 is a flow chart illustrating a speech recognition method according to another embodiment of the present disclosure.

In an embodiment of the present disclosure, as illustrated in FIG. 3, block S102 may include block S201 to block S204.

At block S201, each of current decoding paths is extended according to a jumping path in the decoding network, and the blank unit is added dynamically during an extending process to obtain at least one extending path with the added blank unit.

The process of extending the decoding path is a process of progressing from the beginning position of the decoding network to the ending position of the decoding network along jumping paths between the respective basic pronunciation units.

For example, when the speech signal has been extended to the feature vector frame i and at least one decoding path (which may be referred to as the current decoding path) is obtained, and if it is assumed that the feature vector frame i corresponds to the basic pronunciation unit A in one of the current decoding paths, the current decoding paths may be extended according to the respective jumping paths of the basic pronunciation unit A in the decoding network to obtain possible extending paths. When a step is progressed in the decoding network, it indicates a possible jumping path from the feature vector frame i in the speech signal to a feature vector frame i+1.

In an embodiment of the present disclosure, as the path extending proceeds, when the extending reaches a basic pronunciation unit, a blank (black) unit may be added to the basic pronunciation unit and jumping paths related to the blank unit may be added. In detail, the first basic pronunciation unit to which each of the decoding paths is currently extended can be determined; a jumping path from the first basic pronunciation unit to the blank unit and a jumping path from the blank unit to the blank unit itself may be added for the first basic pronunciation unit, so as to generate the at least one extending path with respect to the first basic pronunciation unit with the added blank unit.

Figure 4A:
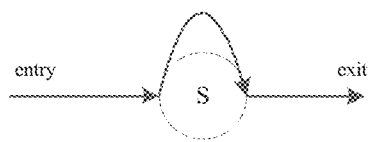
FIG. 4a is a schematic diagram illustrating a node S in a decoding network according to an embodiment of the present disclosure.
Figure 4B:
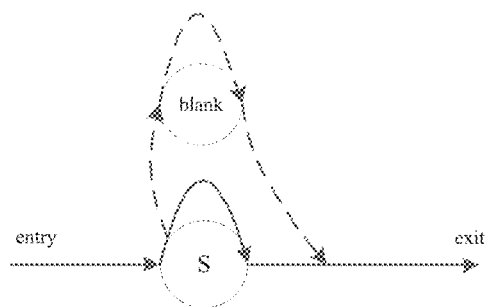
FIG. 4b is a schematic diagram illustrating a node S in FIG. 4a which is added with a blank node according to an embodiment of the present disclosure.

For example, for a node S of a decoding network in FIG. 4a, a topology graph with the added blank unit may be illustrated in FIG. 4b. On the basis of the original path S→S (i.e., jumping from the node S to the node S), a path S→blank and a path blank→blank may be added. In this way, on the basis of jumping paths in the decoding network, when it has extended to a basic pronunciation unit, the jumping paths related to the blank unit may be added to the basic pronunciation unit and the current decoding path is extended according to the added jumping paths.

Therefore, when the decoding path enters the node S, the possible extending paths may be obtained, such as, a path S→S (which may be repeated several times, in which the number of times is greater than or equal to 0), a path S→blank, a path blank→blank (which may be repeated several times, in which the number of times is greater than or equal to 0) and a path blank→exit (a next basic pronunciation unit of the node S in the decoding path). Each jumping indicates a jumping between the feature vector frames in the speech signal.

Figure 5:
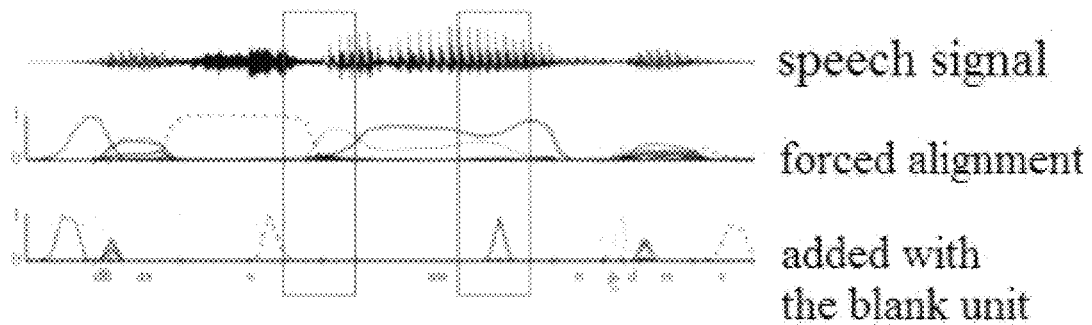
FIG. 5 is a schematic diagram illustrating contusion between two pronunciation units in a speech recognition method according to an embodiment of the present disclosure.

The blank unit represents a non-pronunciation unit that may identify a pause between phonemes and between words. The embodiments of the present disclosure may solve the problem of frame classification at a confusion position between the two pronunciation units by adding the blank unit for each pronunciation unit. The confusion position between the two pronunciation units may be generally classified as a left label, a right label or a short pause in the conventional "forced alignment", which may result in confusion and inaccurate recognition at the confusion position between the two pronunciation units. FIG. 5 is a schematic diagram illustrating confusion between two pronunciation units in a speech recognition method according to an embodiment of the present disclosure. As illustrated in FIG. 5, the confusion positions may be illustrated by boxes. As can be seen from FIG. 5, by adding the blank unit, confusion will not occur, and the accuracy of speech recognition may be improved.

In addition, in the embodiments of the present disclosure, the blank unit is dynamically added during the extending process. That is, when it has extended to the basic pronunciation unit, the jumping paths related to the blank unit may be added at the basic pronunciation unit, and the jumping paths of the basic pronunciation unit may be merged with the paths related to the blank unit, which may effectively reduce the possible decoding paths, thereby speeding up the decoding process.

At block S202, a score of each of the at least one extending path on the acoustic model and the language model is obtained according to a current feature vector frame extracted from the speech signal.

For example, for possible extending paths obtained from the jumping paths of the basic pronunciation unit A in the above example, a score of each possible extending path may be determined on the acoustic model and the language model according to the feature vector frame i+1. The possible extending paths may be screened according to the scores to obtain a decoding path corresponding to the speech signal for arriving at the feature vector frame i+1 (S203).

The score of the extending path may be a sum of acoustic model scores and language model scores of the basic pronunciation units on the extending path. In detail, for example, assuming that the basic pronunciation unit A jumps to the basic pronunciation unit B in the extending path, the acoustic model score of B may be obtained according to the acoustic model and the language model score of B may be obtained according to the language model. The acoustic model score of B and the language model score of B may be accumulated to the score of the decoding path that is not extended to B, thereby obtaining the score of the extending path. The obtaining of the acoustic model score and the language model score may be same as those of the related art and will not be described in detail herein.

At block S203, the at least one extending path is screened according to the scores, and the corresponding current decoding path is updated according to a screening result.

Compared to the decoding path before updating, the updated current decoding path further has a unit node (which may be the basic pronunciation unit or the blank unit) corresponding to the feature vector frame i+1.

In embodiments of the present disclosure, there may be a variety of methods for screening the extending paths according to the scores. For example, a preset number of extending paths with a higher score are selected as the new current decoding paths.

In an embodiment of the present disclosure, a difference between the score of each of the at least one extending path and a highest score in the current decoding paths is obtained; and when the difference between the score of the extending path and the highest score is less than a preset threshold, the extending path is regarded as the new current decoding path.

Certainly, the present disclosure is not limited to the methods described above, and the methods for screening by other screening rules may also be applicable to the present disclosure.

For the acoustic model trained based on CTC, its score has a typical spike phenomenon, that is, when a feature vector frame of the speech signal is located at a certain basic pronunciation unit, then for this feature vector frame, the acoustic model score of this basic pronunciation unit will be significantly higher than that of other units. For the feature vector frame which is not located at the basic pronunciation unit, the score of the blank unit will be significantly higher than that of other units. In other words, for a certain feature vector frame, if the score of the blank unit is highest, it indicates that this feature vector frame is not located at any basic pronunciation unit.

In order to reduce the number of possible decoding paths in the decoding process, the paths may be cut during the extending process. Therefore, in an embodiment of the present disclosure, based on the spike phenomenon described above, cutting strategy may be made according to the score of the basic pronunciation unit and the score of the blank unit corresponding to the basic pronunciation unit in the extending path.

In detail, in an embodiment of the present disclosure, a score of the blank unit and a score of the first basic pronunciation unit are obtained according to the current feature vector frame; and when the score of the blank unit is less than the score of the first basic pronunciation unit, the preset threshold is lowered when determining whether the extending path into which the first basic pronunciation unit enters is regarded as the new current decoding path.

For example, in the above example, after the decoding path reaches the basic pronunciation unit A, the score of the feature vector frame (i.e., the feature vector frame i+1) at A and the score of the feature vector frame at the blank unit may be obtained. If the score of the feature vector frame at A is less than the score at the blank unit, it indicates two possibilities. One is that, the current feature vector frame should be at the blank unit. The other is that, the current feature vector frame should be at the unit that has a higher score than the blank unit. Therefore, when determining whether the extending path into which the basic pronunciation unit A enters is regarded as the new current decoding path, a cutting threshold should be narrowed, i.e., the above threshold should be lowered. That is, it is stricter to cut the extending paths into which the basic pronunciation unit A enters, thereby reducing the number of extending paths and improving the decoding speed.

Further, in an embodiment of the present disclosure, it is also possible to determine whether an extending path has reached a suffix; and when the extending path has reached the suffix, the preset threshold is lowered when determining whether the extending path is regarded as the new current decoding path.

In the decoding process, when the decoding path reaches the suffix, it is necessary to query the actual language model score of the decoding path. Therefore, the preset threshold is lowered when determining whether the extending path that has reached the suffix is regarded as the new current decoding path, which may more strictly cut the extending paths that have reached at the suffix, thereby reducing the number of extending paths and further reducing the number of times for querying the actual language model score and improving the decoding speed.

At block S204, when the current feature vector frame is a final feature vector frame of the speech signal, the optimum decoding path is selected from the updated current decoding paths according to the scores.

If the current feature vector frame is the final feature vector frame of the speech signal, it indicates the path extending is completed. Therefore, the optimum decoding path can be selected from all the obtained decoding paths. In detail, according to the score of each decoding path, the decoding path having the highest score may be selected from the current decoding paths as the optimum decoding path.

At block S103, the optimum decoding path is outputted as a recognition result of the speech signal.

With the speech recognition method according to embodiments of the present disclosure, the speech signal is decoded according to the acoustic model established based on connectionist temporal classification and the decoding network, and the blank unit is added dynamically during the decoding process, such that the optimum decoding path with the added blank unit is obtained and regarded as the recognition result of the speech signal, which may solve the problem that confusion may occur between two pronunciation units, thereby improving the accuracy of speech recognition, and also effectively reducing the possible decoding paths, and improving the decoding speed during the recognition process.

In order to realize the above embodiments, the present disclosure also provides a speech recognition device.

The speech recognition device includes: a receiving module, configured to receive a speech signal; a decoding module, configured to decode the speech signal according to an acoustic model, a language model and a decoding network established in advance, and add a blank unit dynamically during a decoding process to obtain an optimum decoding path with the added blank unit, in which the acoustic model is trained based on connectionist temporal classification, the acoustic model includes basic pronunciation units and the blank unit, and the decoding network includes a plurality of decoding paths consisting of the basic pronunciation units; and an outputting module, configured to output the optimum decoding path as a recognition result of the speech signal.

Figure 6:
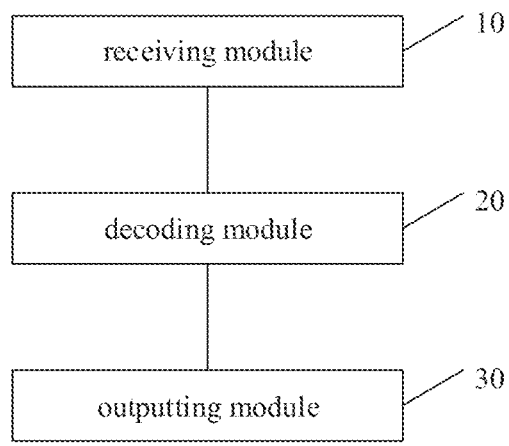
FIG. 6 is a first block diagram illustrating a speech recognition device according to an embodiment of the present disclosure.

FIG. 6 is a first block diagram illustrating a speech recognition device according to an embodiment of the present disclosure.

As illustrated in FIG. 6, the device includes a receiving module 10, a decoding module 20 and an outputting module 30.

In detail, the receiving module 10 is configured to receive a speech signal.

The decoding module 20 is configured to decode the speech signal according to an acoustic model, a language model and a decoding network established in advance, and to add a blank unit dynamically during a decoding process to obtain an optimum decoding path with the added blank unit. The acoustic model is trained based on connectionist temporal classification. The acoustic model includes basic pronunciation units and the blank unit. The decoding network includes a plurality of decoding paths consisting of the basic pronunciation units.

In an embodiment of the present disclosure, the pre-established acoustic model is based on CTC (Connectionist temporal classification) training in detail, feature extraction may be performed on a large number of speech signals to obtain respective feature vectors of the speech signals. In each feature vector, a blank label is added every predetermined number of pronunciation units. The speech signals added with the blank labels are trained based on CTC to establish the acoustic model. The acoustic model includes a plurality of basic pronunciation units and the blank unit.

The language model may be any language model in the related art or in the future, which is not limited in the present disclosure.

The plurality of basic pronunciation units and jump relationships (i.e. jumping paths) between them in the acoustic model may form a large number of decoding paths. These decoding paths form the decoding network.

The basic pronunciation unit may be, for example an initial consonant of a Chinese syllable or a simple or compound vowel of a Chinese syllable, called as a phoneme.

For example, FIG. 2 is a schematic diagram illustrating a decoding network according to an embodiment of the present disclosure. As illustrated in FIG. 2, the dotted circle represents the beginning of the decoding path. The solid circles (such as A and B) represent the basic pronunciation unit in the decoding network. The arrow represents a jumping path between the basic pronunciation units. As can be seen from FIG. 2, there are a plurality of decoding paths in the decoding network. Each decoding path is a possible decoding result for decoding the speech signal.

In embodiments of the present disclosure, the process of decoding the speech signal is a process of selecting an optimum decoding path from the plurality of decoding paths in the decoding network according to the feature vector frame of the speech signal.

Figure 7:
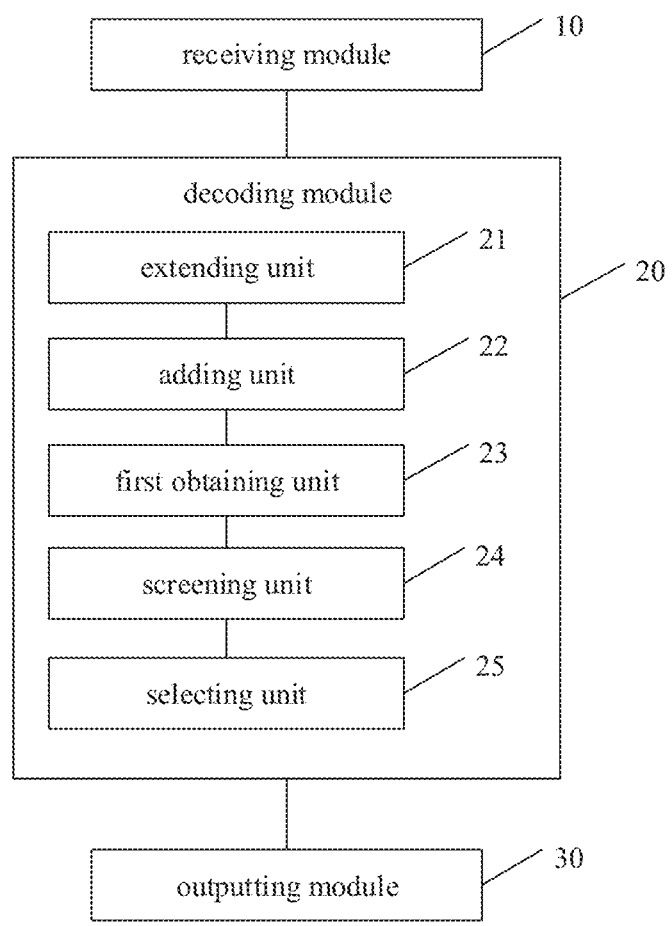
FIG. 7 is a second block diagram illustrating a speech recognition device according to an embodiment of the present disclosure.

In an embodiment of the present disclosure, as illustrated in FIG. 7, the decoding module 20 may include an extending unit 21, an adding unit 22, a first obtaining unit 23, a screening unit 24 and a selecting unit 25.

The extending unit 21 is configured to extend each of current decoding paths according to a jumping path in the decoding network.

The process of extending the decoding path by the extending unit 21 is a process of progressing from the beginning position of the decoding network to the ending position of the decoding network along jumping paths between the respective basic pronunciation units.

For example, when the speech signal has been extended to the feature vector frame i and at least one decoding path (which may be referred to as the current decoding path) is obtained, and if it is assumed that the feature vector frame i corresponds to the basic pronunciation unit A in one of the current decoding paths, the current decoding paths may be extended by the extending unit 21 according to the respective jumping paths of the basic pronunciation unit A in the decoding network to obtain possible extending paths. When a step is progressed in the decoding network, it indicates a possible jumping path from the feature vector frame i in the speech signal to a feature vector frame i+1.

The adding unit 22 is configured to add the blank unit dynamically during an extending process to obtain at least one extending path with the added blank unit.

In an embodiment of the present disclosure, as the path extending proceeds, when the extending reaches a basic pronunciation unit, the adding unit 22 adds a blank (black) unit to the basic pronunciation unit and jumping paths related to the blank unit. In detail, the adding unit 22 is configured to: determine the first basic pronunciation unit to which each of the decoding paths is currently extended; and add for the first basic pronunciation unit, a jumping path from the first basic pronunciation unit to the blank unit and a jumping path from the blank unit to the blank unit itself, so as to generate the at least one extending path with respect to the first basic pronunciation unit.

For example, for a node S of a decoding network in FIG. 4a, a topology graph with the added blank unit may be illustrated in FIG. 4b. On the basis of the original path S→S (i.e., jumping from the node S to the node S), a path S→blank and a path blank→blank may be added. In this way, on the basis of jumping paths in the decoding network, when it has extended to the basic pronunciation unit, the jumping paths related to the blank unit may be added to the basic pronunciation unit and the current decoding path is extended according to the added jumping paths.

Therefore, when the decoding path enters the node S, the possible extending paths may be obtained, such as, a path S→S (which may be repeated several times, in which the number of times is greater than or equal to 0), a path S→blank, a path blank→blank (which may be repeated several times, in which the number of times is greater than or equal to 0) and a path blank→exit (a next basic pronunciation unit of the node S in the decoding path). Each jumping indicates a jumping between the feature vector frames in the speech signal.

The blank unit represents a non-pronunciation unit that may identify a pause between phonemes and between words. The embodiments of the present disclosure may solve the problem of frame classification at a confusion position between the two pronunciation units by adding the blank unit for each pronunciation unit. The confusion position between the two pronunciation units may be generally classified as a left label, a right label or a short pause in the conventional "forced alignment", which may result in confusion and inaccurate recognition at the confusion position between the two pronunciation units. FIG. 5 is a schematic diagram illustrating confusion between two pronunciation units in a speech recognition method according to an embodiment of the present disclosure. As illustrated in FIG. 5, the confusion positions may be illustrated by boxes. As can be seen from FIG. 5, by adding the blank unit, confusion will not occur, and the accuracy of speech recognition may be improved.

In addition, in the embodiments of the present disclosure, the blank unit is dynamically added during the extending process. That is, when it has extended to the basic pronunciation unit, the jumping paths related to the blank unit may be added at the basic pronunciation unit, and the jumping paths of the basic pronunciation unit may be merged with the paths related to the blank unit, which may effectively reduce the possible decoding paths, thereby speeding up the decoding process.

The first obtaining unit 23 is configured to obtain a score of each of the at least one extending path on the acoustic model and the language model according to a current feature vector frame extracted from the speech signal.

For example, for possible extending paths obtained from the jumping paths of the basic pronunciation unit A in the above example, a score of each possible extending path may be determined on the acoustic model and the language model by the first obtaining unit 23 according to the feature vector frame i+1. The possible extending paths may be screened by the screening unit 24 according to the scores to obtain a decoding path corresponding to the speech signal for arriving at the feature vector frame i+1.

The score of the extending path may be a sum of acoustic model scores and language model scores of the basic pronunciation units on the extending path. In detail, for example, assuming that the basic pronunciation unit A jumps to the basic pronunciation unit B in the extending path, the first obtaining unit 23 may obtain the acoustic model score of B according to the acoustic model and the language model score of B according to the language model, and then accumulate the acoustic model score of B and the language model score of B to the score of the decoding path that is not extended to B, thereby obtaining the score of the extending path. The obtaining of the acoustic model score and the language model score may be same as those of the related art and will not be described in detail herein.

The screening unit 24 is configured to screen the at least one extending path according to the scores, and update the corresponding current decoding path according to a screening result.

Compared to the decoding path before updating, the updated current decoding path further has a unit node (which may be the basic pronunciation unit or the blank unit) corresponding to the feature vector frame i+1.

In embodiments of the present disclosure, the screening unit 24 may have a variety of methods for screening the extending paths according to the scores. For example, a preset number of extending paths with a higher score are selected as the new current decoding paths.

In an embodiment of the present disclosure, the screening unit 24 may be configured to: obtain a difference between the score of each of the at least one extending path and a highest score in the current decoding paths; and when the difference between the score of the extending path and the highest score is less than a preset threshold, regard the extending path as a new current decoding path.

Certainly, the present disclosure is not limited to the methods described above, and the methods for screening by other screening rules may also be applicable to the present disclosure.

The selecting unit 25 is configured to, when the current feature vector frame is a final feature vector frame of the speech signal, select the optimum decoding path from the updated current decoding paths according to the scores.

If the current feature vector frame is the final feature vector frame of the speech signal, it indicates the path extending is completed. Therefore, the optimum decoding path can be selected by the selecting unit 25 from all the obtained decoding paths. In detail, the selecting unit 25 may select the decoding path having the highest score from the current decoding paths according to the score of each decoding path and use the selected decoding path as the optimum decoding path.

The outputting module 30 is configured to output the optimum decoding path as a recognition result of the speech signal.

With the speech recognition device according to embodiments of the present disclosure, the speech signal is decoded according to the acoustic model established based on connectionist temporal classification and the decoding network, and the blank unit is added dynamically during the decoding process, such that the optimum decoding path with the added blank unit is obtained and regarded as the recognition result of the speech signal, which may solve the problem that confusion may occur between two pronunciation units, thereby improving the accuracy of speech recognition, and also effectively reducing the possible decoding paths, and improving the decoding speed during the recognition process.

For the acoustic model trained based on CTC, its score has a typical spike phenomenon that is, when a feature vector frame of the speech signal is located at a certain basic pronunciation unit, then for this feature vector frame, the acoustic model score of this basic pronunciation unit will be significantly higher than that of other units. For the feature vector frame which is not located at the basic pronunciation unit, the score of the blank unit will be significantly higher than that of other units. In other words, for a certain feature vector frame, if the score of the blank unit is highest, it indicates that this feature vector frame is not located at any basic pronunciation unit.

In order to reduce the number of possible decoding paths in the decoding process, the paths may be cut during the extending process. Therefore, in an embodiment of the present disclosure, based on the spike phenomenon described above, cutting strategy may be made according to the score of the basic pronunciation unit and the score of the blank unit corresponding to the basic pronunciation unit in the extending path.

Figure 8:
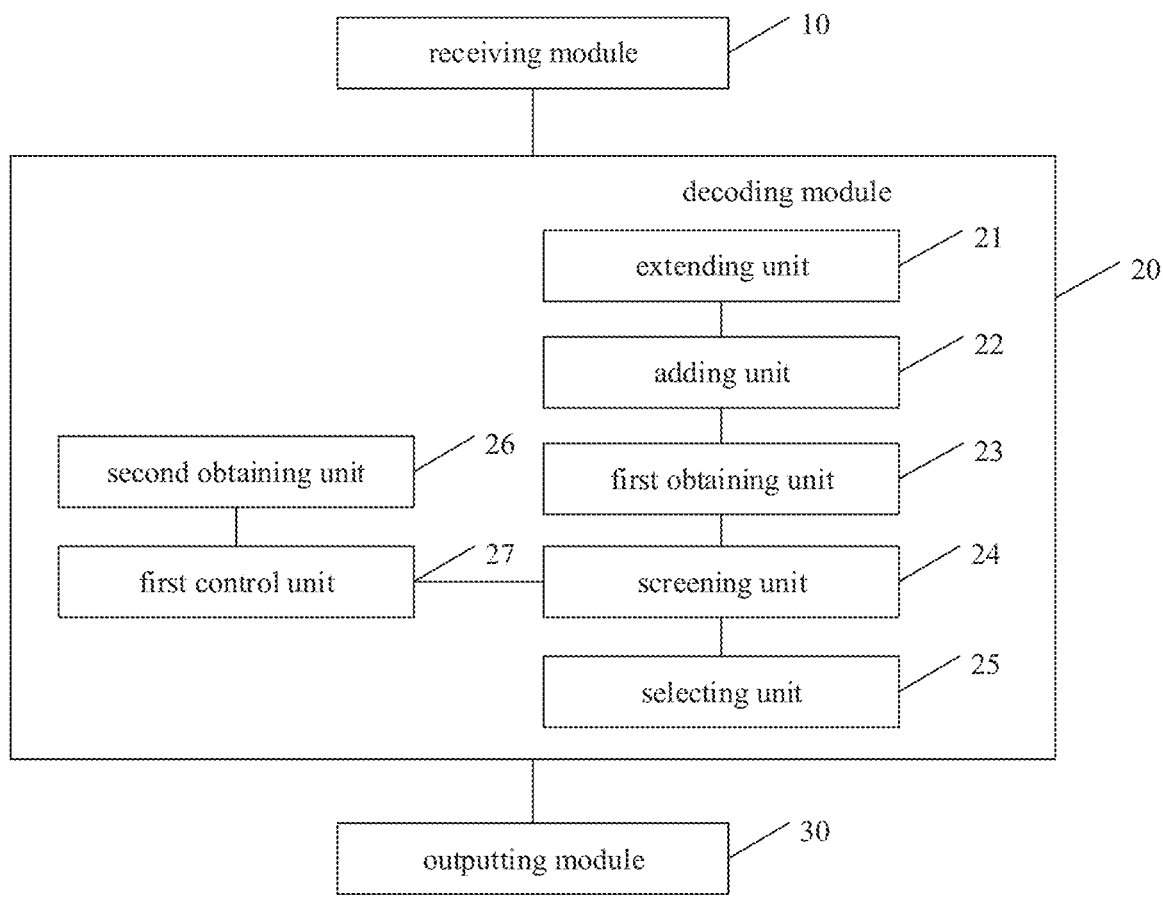
FIG. 8 is a third block diagram illustrating a speech recognition device according to an embodiment of the present disclosure.
Figure 9:
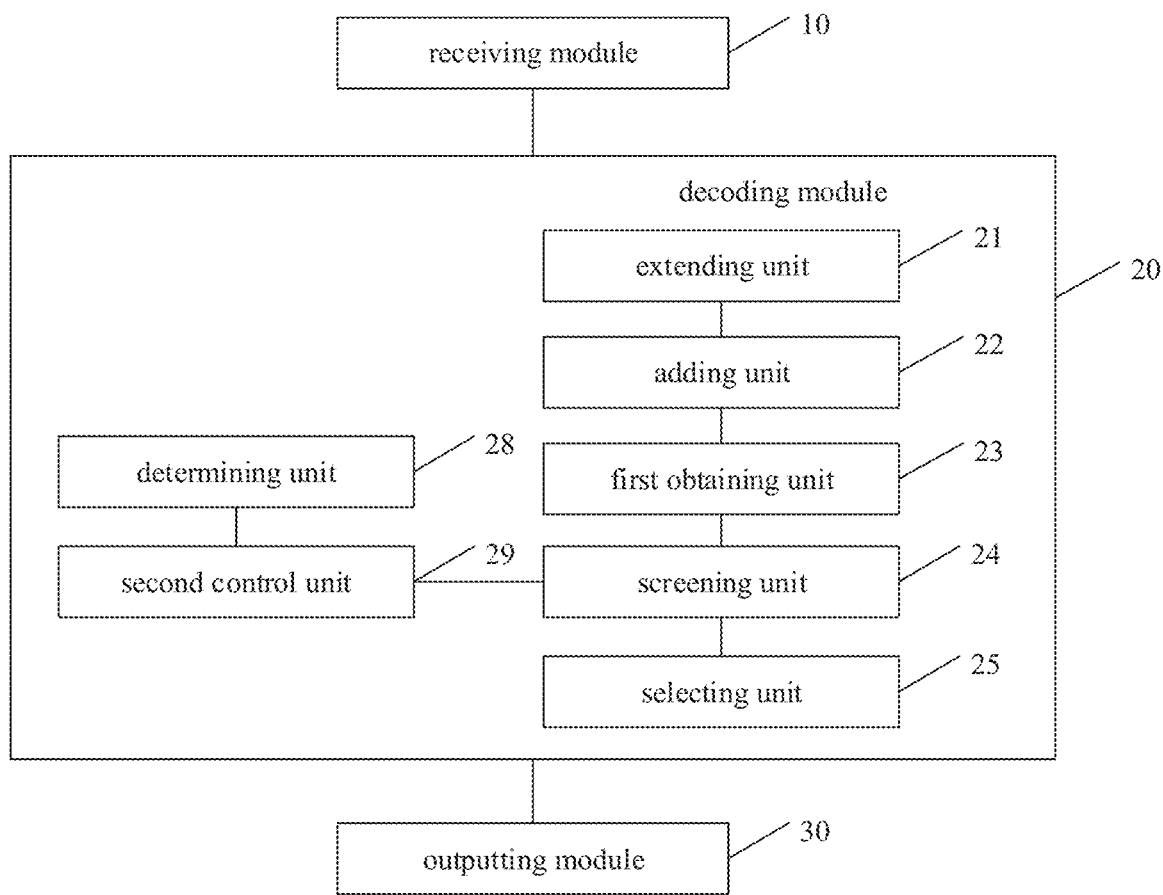
FIG. 9 is a fourth block diagram illustrating a speech recognition device according to an embodiment of the present disclosure.

The following is illustrative examples with reference to FIGS. 8 and 9.

FIG. 8 is a third block diagram illustrating a speech recognition device according to an embodiment of the present disclosure.

As illustrated in FIG. 8, based on FIG. 7, in the speech recognition device according to an embodiment of the present disclosure, the decoding module 20 further includes a second obtaining unit 26 and a first control unit 27.

The second obtaining unit 26 is configured to obtain a score of the blank unit and a score of the first basic pronunciation unit according to the current feature vector frame.

The first control unit 27 is configured to, when the score of the blank unit is less than the score of the first basic pronunciation unit, lower the preset threshold when determining whether the extending path of the first basic pronunciation unit is regarded as the new current decoding path. The score may be a sum of an acoustic model score and a language model score.

For example, in the above example, after the decoding path reaches the basic pronunciation unit A, the score of the feature vector frame (i.e., the feature vector frame i+1) at A and the score of the feature vector frame at the blank unit may be obtained. If the score of the feature vector frame at A is less than the score at the blank unit, it indicates two possibilities. One is that, the current feature vector frame should be at the blank unit. The other is that, the current feature vector frame should be at the unit that has a higher score than the blank unit. Therefore, when determining whether the extending path in to which the basic pronunciation unit A enters is regarded as the new current decoding path, a cutting threshold should be narrowed, i.e., the above threshold should be lowered. That is, it is stricter to cut the extending paths into which the basic pronunciation unit A enters, thereby reducing the number of extending paths and improving the decoding speed.

FIG. 9 is a fourth block diagram illustrating a speech recognition device according to an embodiment of the present disclosure.

As illustrated in FIG. 9, based on FIG. 7, in the speech recognition device according to an embodiment of the present disclosure, the decoding module 20 may further include a determining unit 28 and a second control unit 29.

The determining unit 28 is configured to determine whether an extending path has reached a suffix.

The second control unit 29 is configured to, when the extending path has reached the suffix, lower the preset threshold when determining whether the extending path is regarded as the new current decoding path.

In the decoding process, when the decoding path reaches the suffix, it is necessary to query the actual language model score of the decoding path. Therefore, the preset threshold is lowered when determining whether the extending path that has reached the suffix is regarded as the new current decoding path, which may more strictly cut the extending paths that have reached at the suffix, thereby reducing the number of extending paths and further reducing the number of times for querying the actual language model score and improving the decoding speed.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In the description of the present disclosure, it should be understood that, terms such as "first" and "second" are used herein for purposes of description and are not intended to indicate or imply relative importance or significance. In addition, in the description of the present disclosure, the term "a plurality of" means two or more.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A speech recognition method, comprising:
   receiving a speech signal;
   decoding the speech signal according to an acoustic model, a language model and a decoding network established in advance, and adding a blank unit dynamically during a decoding process to obtain an optimum decoding path with the added blank unit, wherein the acoustic model is obtained by training based on connectionist temporal classification, the acoustic model comprises basic pronunciation units and the blank unit, and the decoding network comprises a plurality of decoding paths consisting of the basic pronunciation units; and
   outputting the optimum decoding path as a recognition result of the speech signal;
   wherein decoding the speech signal according to an acoustic model, a language model and a decoding network established in advance and adding a blank unit dynamically during a decoding process to obtain an optimum decoding path with the added blank unit comprises:
      extending each of current decoding paths according to a jumping path in the decoding network, and adding the blank unit dynamically during an extending process to obtain at least one extending path with the added blank unit;
      obtaining a score of each of the at least one extending path on the acoustic model and the language model according to a current feature vector frame extracted from the speech signal;
      screening the at least one extending path according to the scores, and updating current decoding paths according to a screening result; and
      when the current feature vector frame is a final feature vector frame of the speech signal, selecting the optimum decoding path from the updated current decoding paths according to the scores.

2. The method according to claim 1, wherein screening the at least one extending path according to the scores and updating the current decoding paths according to a screening result comprises:
   obtaining a difference between the score of each of the at least one extending path and a highest score in the current decoding paths; and
   when the difference between the score of an extending path and the highest score is less than a preset threshold, regarding the extending path as a new current decoding path.

3. The method according to claim 2, wherein adding a blank unit dynamically during an extending process comprises:

determining a first basic pronunciation unit to which each of the current decoding paths is currently extended;

adding, for the first basic pronunciation unit, a jumping path from the first basic pronunciation unit to the blank unit and a jumping path from the blank unit to the blank unit itself, to generate the at least one extending path with the added blank unit.

4. The method according to claim 3, further comprising:
obtaining a score of the blank unit and a score of the first basic pronunciation unit according to the current feature vector frame; and when the score of the blank unit is less than the score of the first basic pronunciation unit, lowering the preset threshold when determining whether the extending path of the first basic pronunciation unit is regarded as the new current decoding path.

5. The method according to claim 3, further comprising:
determining whether an extending path has reached a suffix; and when the extending path has reached the suffix, lowering the preset threshold when determining whether the extending path is regarded as the new current decoding path.

6. A speech recognition device, comprising:
one or more processors;
a memory having instructions stored thereon that, when executed by the one or more processors, is configured to implement a speech recognition method comprising:
receiving a speech signal;
decoding the speech signal according to an acoustic model, a language model and a decoding network established in advance, and adding a blank unit dynamically during a decoding process to obtain an optimum decoding path with the added blank unit, wherein the acoustic model is obtained by training based on connectionist temporal classification, the acoustic model comprises basic pronunciation units and the blank unit, and the decoding network comprises a plurality of decoding paths consisting of the basic pronunciation units; and
outputting the optimum decoding path as a recognition result of the speech signal;
wherein decoding the speech signal according to an acoustic model, a language model and a decoding network established in advance, and adding a blank unit dynamically during a decoding process to obtain an optimum decoding path with the added blank unit comprises:
extending each of current decoding paths according to a jumping path in the decoding network;
adding the blank unit dynamically during an extending process to obtain at least one extending path with the added blank unit;
obtaining a score of each of the at least one extending path on the acoustic model and the language model according to a current feature vector frame extracted from the speech signal;
screening the at least one extending path according to the scores, and updating the current decoding path according to a screening result; and
when the current feature vector frame is a final feature vector frame of the speech signal, selecting the optimum decoding path from the updated current decoding paths according to the scores.

7. The device according to claim 6, wherein screening the at least one extending path according to the scores, and updating the current decoding path according to a screening result comprises:
obtaining a difference between the score of each of the at least one extending path and a highest score in the current decoding paths; and
when the difference between the score of an extending path and the highest score is less than a preset threshold, regarding the extending path as a new current decoding path.

8. The device according to claim 7, wherein adding the blank unit dynamically during an extending process comprises:
determining a first basic pronunciation unit to which each of the current decoding paths is currently extended; and
adding, for the first basic pronunciation unit, a jumping path from the first basic pronunciation unit to the blank unit and a jumping path from the blank unit to the blank unit itself, to generate the at least one extending path with the added blank unit.

9. The device according to claim 8, wherein the speech recognition method further comprises:
obtaining a score of the blank unit and a score of the first basic pronunciation unit according to the current feature vector frame; and
when the score of the blank unit is less than the score of the first basic pronunciation unit, lowering the preset threshold when determining whether the extending path of the first basic pronunciation unit is regarded as the new current decoding path.

10. The device according to claim 9, wherein the speech recognition method further comprises:
determining whether an extending path has reached a suffix; and
when the extending path has reached the suffix, lowering the preset threshold when determining whether the extending path is regarded as the new current decoding path.

11. A non-transitory computer-readable storage medium having stored therein one or more programs that, when executed by a device, causes the device to perform a speech recognition method, the speech recognition method comprising:
receiving a speech signal;
decoding the speech signal according to an acoustic model, a language model and a decoding network established in advance, and adding a blank unit dynamically during a decoding process to obtain an optimum decoding path with the added blank unit, wherein the acoustic model is obtained by training based on connectionist temporal classification, the acoustic model comprises basic pronunciation units and the blank unit, and the decoding network comprises a plurality of decoding paths consisting of the basic pronunciation units; and
outputting the optimum decoding path as a recognition result of the speech signal;
wherein decoding the speech signal according to an acoustic model, a language model and a decoding network established in advance and adding a blank unit dynamically during a decoding process to obtain an optimum decoding path with the added blank unit comprises:
extending each of current decoding paths according to a jumping path in the decoding network, and adding the blank unit dynamically during an extending process to obtain at least one extending path with the added blank unit;

obtaining a score of each of the at least one extending path on the acoustic model and the language model according to a current feature vector frame extracted from the speech signal;

screening the at least one extending path according to the scores, and updating current decoding paths according to a screening result; and when the current feature vector frame is a final feature vector frame of the speech signal, selecting the optimum decoding path from the updated current decoding paths according to the scores.

12. The storage medium according to claim 11, wherein screening the at least one extending path according to the scores and updating the current decoding paths according to a screening result comprises:

obtaining a difference between the score of each of the at least one extending path and a highest score in the current decoding paths; and when the difference between the score of an extending path and the highest score is less than a preset threshold, regarding the extending path as a new current decoding path.

13. The storage medium according to claim 12, wherein adding a blank unit dynamically during an extending process comprises:

determining a first basic pronunciation unit to which each of the current decoding paths is currently extended;

adding, for the first basic pronunciation unit, a jumping path from the first basic pronunciation unit to the blank unit and a jumping path from the blank unit to the blank unit itself, to generate the at least one extending path with the added blank unit.

14. The storage medium according to claim 13, wherein the speech recognition method further comprises:

obtaining a score of the blank unit and a score of the first basic pronunciation unit according to the current feature vector frame; and when the score of the blank unit is less than the score of the first basic pronunciation unit, lowering the preset threshold when determining whether the extending path of the first basic pronunciation unit is regarded as the new current decoding path.

15. The storage medium according to claim 13, wherein the speech recognition method further comprises:

determining whether an extending path has reached a suffix; and when the extending path has reached the suffix, lowering the preset threshold when determining whether the extending path is regarded as the new current decoding path.

* * * * *